UNITED STATES PATENT OFFICE.

HERMAN B. KIPPER, OF SOLVAY, NEW YORK.

PROCESS OF MAKING A SUBSTITUTE FOR WHITING.

1,264,092.

Specification of Letters Patent.

Patented Apr. 23, 1918.

No Drawing.

Application filed April 30, 1915. Serial No. 25,024.

*To all whom it may concern:*

Be it known that I, HERMAN B. KIPPER, a citizen of the United States, residing at Solvay, township of Geddes, in the county of Onondaga and State of New York, have invented new and useful Improvements in Processes of Making a Substitute for Whiting, of which the following is a specification.

My present invention has for its object to provide a whiting or product made therefrom and a process of making the same whereby the whiting or the products made therefrom will have the characteristics of the so-called natural whiting or the products made from the so-called natural whiting.

Heretofore, and at the present time, English and French chalks are extensively imported into this country and converted by various processes into the so-called natural whiting which is employed extensively in the making of putty and paints and as a filler for rubber goods, paper and similar purposes. A product known as artificial whiting is also manufactured to some extent, by processes similar to those employed in the conversion of natural chalk into whiting, from limestone rock, precipitated chalk, or other forms of calcium carbonate. These so-called artificial whitings, however, as heretofore manufactured, are inferior to natural whiting in physical character and texture and, hence, will not be used by manufacturers of different products made from whiting. For example, it has been found that putty made from or rubber containing natural whiting as a filler possesses greater elasticity and strength than such products made from or containing artificial whiting.

According to the present invention, a substance is added to artificial whiting either during or after its manufacture by the usual processes that will give to the artificial whiting the characteristics of true natural whiting. For example, in the process of manufacturing whiting from precipitated chalk, limestone or other form of calcium, such substance is added preferably during the grinding thereof, while in the manufacture of putty from artificial whiting, such substances may be incorporated into the putty directly with the linseed or other oils, as paraffin oil or the like, instead of during the manufacture of the whiting.

In carrying out the invention, I incorporate with the artificial whiting, either during or after its manufacture, an organic salt or soap. In those cases where the whiting contains free alkali or lime, an organic derivative is added which will convert the free alkali or lime into a salt or soap. For example, in such cases, I may add a small percentage of an organic acid, such as oleic acid, tannic acid, benzoic acid, or any of the higher organic fatty acids, or a phenol, such as carbolic acid, or alpha or beta naphthol. In those cases where the artificial whiting contains no free alkali or lime, or is chemically neutral, a suitable percentage of free alkali or lime may be added to the whiting during its process of grinding, and an organic acid or a phenol subsequently added thereto to convert such free alkali or lime into a salt or soap, or, instead of supplying the free alkali or lime, an organic acid salt or soap may be added to the whiting. In either of these instances, however, a salt or soap in incorporated with the finely ground material.

It is to be understood that the present invention is not limited to processes of manufacturing the artificial whiting from precipitated calcium carbonate or limestone, but may be applied to the manufacture of artificial whiting from any other inert material suitable for the purpose such, for example, as shale, slate or soapstone, or any inert rock or earthy materials and which, according to the present invention, will produce an artificial whiting having the characteristics of natural whiting.

An artificial whiting manufactured in accordance with the present invention is amorphus, as distinguished from the crystalline character of a large percentage of the particles of artificial whitings heretofore procurable on the market, and it possesses the characteristics of natural whiting, as heretofore stated.

I claim as my invention:—

1. The herein described method of making a filler of the character described from finely divided inorganic earthy material which comprises incorporating with such material a compound of the higher fatty acids having the formula $X-COO-R$ in which $X$ is an alkyl radical and $R$ is either hydrogen or a metal.

2. The herein described improvement in the manufacture of a filler of the character described from finely ground inorganic earthy material which comprises incorporating with such material a small percentage of a salt of a higher fatty acid.

3. The herein described improvement in the manufacture of artificial whiting from calcium carbonate, which comprises incorporating with such material a small percentage of a salt of oleic acid.

4. The herein described improvement in the manufacture of a filler of the character described from finely ground inorganic earthy material, which comprises incorporating with such material, in the presence of an alkali, a small percentage of a compound of the higher fatty acids having the formula X—COO—R, in which X is an alkyl radical and R is either hydrogen or a metal.

5. The herein described improvement in the manufacture of a filler of the character described from finely ground inorganic earthy material, which comprises incorporating with such material a small percentage of a salt of a higher fatty acid.

6. The herein described improvement in the manufacture of a filler of the character described from finely ground inorganic earthy material, which comprises incorporating with such material a small percentage of a salt of oleic.

In testimony whereof I have hereunto set my hand in presence of two subscribing witnesses.

HERMAN B. KIPPER.

Witnesses:
C. A. BATEMAN,
CHAS. S. HYER.